US012770028B2

(12) United States Patent
Gopal et al.

(10) Patent No.: US 12,770,028 B2
(45) Date of Patent: Oct. 20, 2026

(54) INTELLIGENT MANAGEMENT OF MACHINE LEARNING INFERENCES IN EDGE-CLOUD SYSTEMS

(71) Applicant: Robert Bosch GmbH, Stuttgart (DE)

(72) Inventors: Sharath Gopal, Fremont, CA (US); Baolin Li, Saugus, MA (US); Marcus Gualtieri, Fremont, CA (US); Xiaowei Zhou, Fremont, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 480 days.

(21) Appl. No.: 18/541,968

(22) Filed: Dec. 15, 2023

(65) Prior Publication Data

US 2025/0200395 A1 Jun. 19, 2025

(51) Int. Cl.
*G06N 5/022* (2023.01)

(52) U.S. Cl.
CPC .................................. *G06N 5/022* (2013.01)

(58) Field of Classification Search
CPC .............................. G06N 20/00; G06N 5/022
USPC ......................................................... 706/46
See application file for complete search history.

(56) References Cited

U.S. PATENT DOCUMENTS 9,876,851 B2 1/2018 Chandramouli et al.
11,153,177 B1 * 10/2021 Hermoni ............. G06F 11/0787
11,503,113 B2 * 11/2022 Dong .................... H04L 67/289
2022/0233119 A1 * 7/2022 Shelton, IV ........... A61B 5/165

OTHER PUBLICATIONS

David et al., "Tensorflow Lite Micro: Embedded Machine Learning on Tinyml Systems," Proceedings of the 4th MLSys Conference, San Jose, CA, USA, 2021, pp. 1-12.
Verhelst et al., "Chapter 18: Machine Learning at the Edge, "Nano-Chips 2030, 2020, pp. 293-322.
Wang et al., "Enabling Edge-Cloud Video Analytics for Robotics Applications," DOI 10.1109/TCC.2022.3142066, IEEE Transactions on Cloud Computing, pp. 1-14.
Banitalebi-Dehkordi et al., "Auto-Split: A General Framework of Collaborative Edge-Cloud AI," ADS Track Paper, KDD '21, Aug. 14-18, 2021, Virtual Event, Singapore, pp. 2543-2553.
(Continued)

*Primary Examiner* — Hung T Vy
(74) *Attorney, Agent, or Firm* — Kathy Takeguchi; Maginot, Moore & Beck LLP

(57) ABSTRACT

A computer-implemented system and method relate an edge device with a local machine learning model, which generates local prediction data and confidence score data, in response to sensor data. Query threshold data is received from a cloud computing system. An assessment result is assessed using the confidence score data and the query threshold data. The assessment result indicates whether or not to generate a query with the sensor data for transmission to the cloud computing system. The local predication data is assigned as a prediction result when the assessment result indicates that the query is not being generated and transmitted. The cloud prediction data is assigned as the prediction result when the assessment result indicates that the query is being generated and transmitted. The cloud prediction data is received from the cloud computing system in response to the query. The edge device is controlled using the prediction result.

20 Claims, 4 Drawing Sheets

(56) References Cited

OTHER PUBLICATIONS

Chinchali et al., "Network offloading policies for cloud robotics: a learning-based approach," Autonomous Robots (2021) 45:997-1012, https://doi.org/10.1007/s10514-021-09987-4, pp. 997-1012.
Redmon et al., "You Only Look Once: Unified, Real-Time Object Detection," Computer Vision Foundation, Proceedings of the IEEE Conference on Computer Vision and Pattern Recognition, 2016, pp. 779-788.
Mnih et al., "Human-level control through deep reinforcement learning," Letter, doi: 10.1038/nature14236, Nature, Feb. 26, 2015, vol. 518, 13 pages.

* cited by examiner

INTELLIGENT MANAGEMENT OF MACHINE LEARNING INFERENCES IN EDGE-CLOUD SYSTEMS

TECHNICAL FIELD

This disclosure relates generally to the intelligent management of machine learning inferences of various machine learning models across edge-cloud systems.

BACKGROUND

Recently, the demand for machine learning (ML) services on edge devices has grown significantly. However, the deployment of ML models on edge devices (e.g., cleaning robots, smart watches, etc.) is challenging because edge devices have limited computing resources (e.g., processing resources, memory resources, etc.) and various constraints (e.g., size constraints, power constraints, weight constraints, etc.). Also, there are a number of ML models, such as deep neural networks (DNNs), which require significantly more computing resources than that offered by some of the smaller edge devices.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to controlling an edge device. The method includes receiving sensor data. The method includes generating, via a local machine learning model, local prediction data using the sensor data. The local prediction data is associated with confidence score data indicating likelihood of the local prediction data. The method includes receiving query threshold data from a cloud computing system. The method includes generating an assessment result indicative of whether or not to transmit a query with the sensor data to the cloud computing system. The assessment result is assessed using the confidence score data and the query threshold data. The method includes assigning the local prediction data as a prediction result when the assessment result indicates that the query is not being transmitted to the cloud computing system. The method includes assigning cloud prediction data as the prediction result when the assessment result indicates that the query is being transmitted to the cloud computing system. The cloud prediction data is received from the cloud computing system in response to the query. The method includes controlling the edge device using the prediction result.

According to at least one aspect, a system comprises one or more processors and one or more memory. The one or more memory are in data communication with the one or more processors. The one or more memory include computer readable data stored thereon that, when executed by the one or more processors, causes the one or more processors to perform a method for controlling an edge device. The method includes receiving sensor data. The method includes generating, via a local machine learning model, local prediction data using the sensor data. The local prediction data is associated with confidence score data indicating likelihood of the local prediction data. The method includes receiving query threshold data from a cloud computing system. The method includes generating an assessment result indicative of whether or not to transmit a query with the sensor data to the cloud computing system. The assessment result is assessed using the confidence score data and the query threshold data. The method includes assigning the local prediction data as a prediction result when the assessment result indicates that the query is not being transmitted to the cloud computing system. The method includes assigning cloud prediction data as the prediction result when the assessment result indicates that the query is being transmitted to the cloud computing system. The cloud prediction data is received from the cloud computing system in response to the query. The method includes controlling the edge device using the prediction result.

According to at least one aspect, one or more non-transitory computer-readable mediums have computer readable data including instructions stored thereon that, when executed by one or more processors, cause the one or more processors to perform a method for controlling an edge device. The method includes receiving sensor data. The method includes generating, via a local machine learning model, local prediction data using the sensor data. The local prediction data is associated with confidence score data indicating likelihood of the local prediction data. The method includes receiving query threshold data from a cloud computing system. The method includes generating an assessment result indicative of whether or not to transmit a query with the sensor data to the cloud computing system. The assessment result is assessed using the confidence score data and the query threshold data. The method includes assigning the local prediction data as a prediction result when the assessment result indicates that the query is not being transmitted to the cloud computing system. The method includes assigning cloud prediction data as the prediction result when the assessment result indicates that the query is being transmitted to the cloud computing system. The cloud prediction data is received from the cloud computing system in response to the query. The method includes controlling the edge device using the prediction result.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
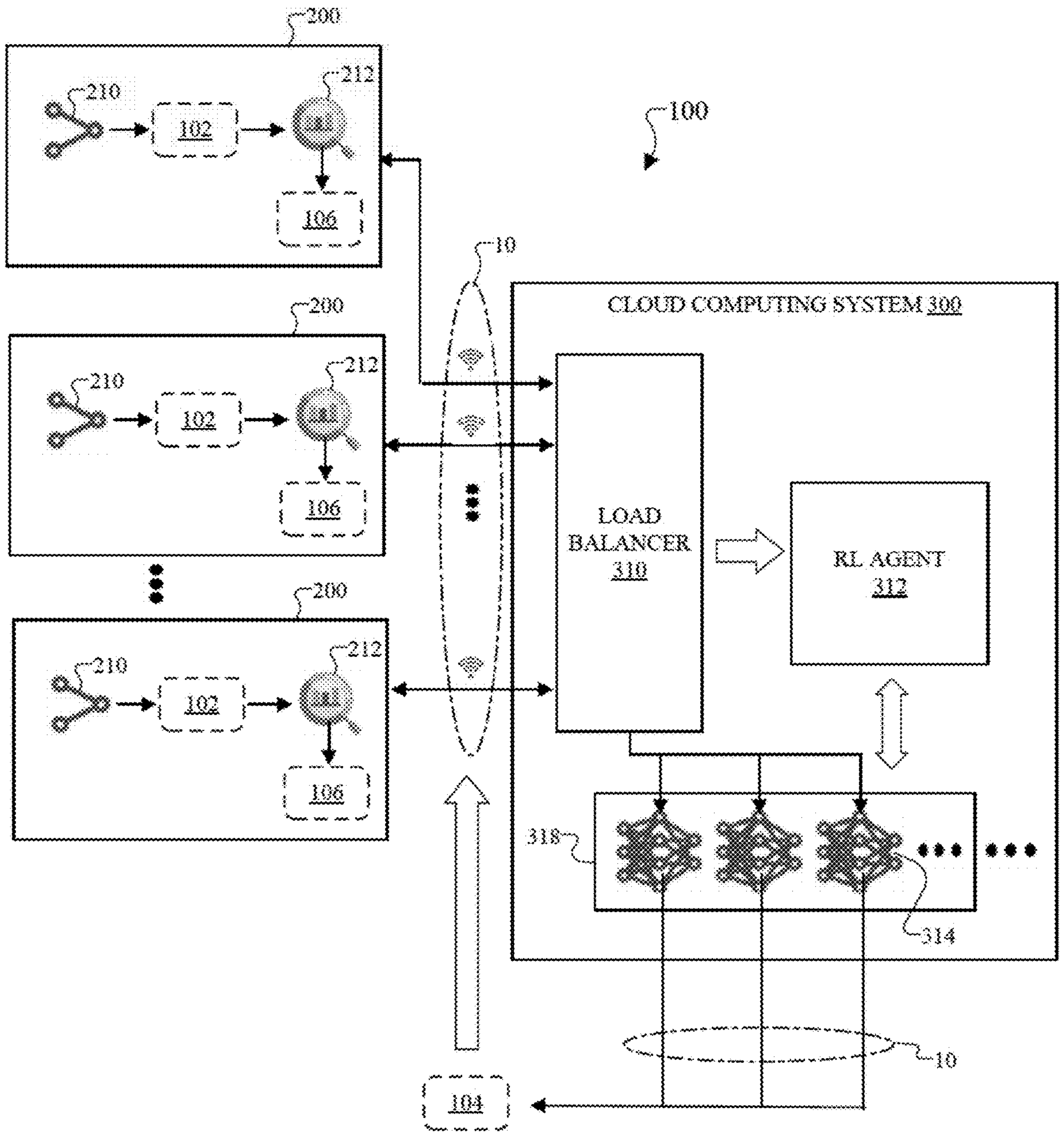
FIG. 1 is a flow diagram that illustrates aspects of an example of an edge-cloud system according to an example embodiment of this disclosure.

FIG. 1 is a flow diagram that illustrates aspects of a system 100, which comprises at least an edge-cloud system according to an example embodiment. The system 100 is configured to intelligently manage machine learning inferences, which are generated by various machine learning models across different computer systems (e.g. an edge device and a cloud computing system of an edge-cloud system, an edge device and a local server over a computer network system, etc.). The system 100 includes at least one local computing system (e.g., edge device 200) and at least one remote computing system (e.g., cloud computing system 300). More specifically, in the example shown in FIG. 1, the system 100 includes a plurality of edge devices and a cloud computing system 300. The cloud computing system 300 is in data communication with each edge device 200 via communication technology 10, which may be wired, wireless, or a combination thereof.

In FIG. 1, each edge device 200 is operatively connected to the cloud computing system 300 via the communication technology. Each edge device 200 performs data processing functions at the "edge" of a network. In this regard, each edge device 200 is a functional, technical device, which is also configured to act as an entry point to at least the network. Each edge device 200 is configured to interface with one or more users. As non-limiting examples, for instance, an edge device 200 may include a mobile robot (e.g., robot vacuum, etc.), a smart watch, an Internet of Things (IoT) device, or any similar edge technology.

Referring to FIG. 1, as a non-limiting example, each edge device 200 is a cleaning robot (e.g., a robot vacuum). Each edge device 200 includes one or more sensors, which are configured to capture sensor data in accordance with, for example, objects in its environment. In this regard, an edge device 200 generates sensor data based on at least the environment. As such, there may be a variation in the timing and amount of sensor data that is obtained by a particular edge device 200. Also, each edge device 200 includes a includes a number of components related to its application, as well as a machine learning (ML) model 210 and a query controller 212.

An ML model 210 is located on an edge device 200. An ML model 210 may be referred to as a local ML model for being employed locally on an edge device 200. An ML model 210 may be a light-weight model. An ML model 210 may comprise a convolutional neural network (CNN) and/or any artificial neural network, which is configured to perform a predetermined task (e.g., classification, etc.) for the edge device 200. In this regard, the ML model 210 is configured to generate at least prediction data (or local prediction data 102) based on input data. The ML model 210 is also configured to generate confidence score data, which provides likelihood data or probability data for corresponding prediction data. As a non-limiting example, for instance, in FIG. 1, each ML model 210 comprises a You Only Look Once (YOLO) model, e.g., YOLOv5s (small), which is configured to perform a predetermined task of real-time object detection.

A query controller 212 is located on or associated with an edge device 200. The query controller 212 is configured to receive the local prediction data from the ML model 210. In addition, the query controller 212 is configured to receive confidence score data corresponding to each local prediction data. The query controller 212 is configured to generate an assessment result regarding the local prediction data. The query controller 212 is configured to determine whether or not a query, which includes the input data, should be sent to the cloud computing system 300 based on the assessment result. In this regard, the query controller 212 is configured to determine whether or not to offload the input data to the cloud computing system 300 to obtain a more accurate machine learning inference from the cloud computing system 300 compared to the local machine learning inference obtained from the ML model 210. The query controller 212 includes software technology, hardware technology, or a combination of hardware and software technology.

As discussed above, the query controller 212 is configured to perform adaptive cloud querying based on the assessment result. The query controller 212 is configured to generate the assessment result based on a set of components. In an example embodiment, the query controller 212 is configured to generate the assessment result based on three components. For example, the first component includes the prediction confidence of the ML model 210. In this regard, for example, the ML model 210 is configured to provide confidence score data in association with the local prediction data. The confidence score data indicates a likelihood or probability regarding corresponding local prediction data. The second component includes a query threshold data, which is a confidence level that is compared to the confidence score data generated from the ML model 210 to determine whether or not to send a query to the cloud computing system 300. The query threshold data is determined and set by the cloud computing system 300 based on a level of activity or a level of busyness of the cloud computing system 300. The third component includes the average round-trip network delay between the edge device 200 and the cloud computing system 300. This third component is available to the edge device 200 by subtracting the cloud processing time from the round-trip time. The cloud processing time refers to an amount of time in which the cloud computing system 300 processes the query. Accordingly, based at least on these three components, the query controller 212 is configured to determine whether or not to generate a query to the cloud computing system 300.

The query controller 212 is configured to generate a query that includes a part of the input data, a version of the input data, or the input data in its entirety. As an example, the query controller 212 is configured to generate a query that includes the input data (e.g., sensor data such as a digital image). In this regard, the query controller 212 forwards the same input data, which was processed by the ML model 210, to the cloud computing system 300. As another example, the query controller 212 is configured to transmit a query that includes intermediate data of the ML model 210 (instead of sending the entirety of the input data). As a non-limiting example, the intermediate data is extracted or output from a particular layer (e.g., second CNN Layer) of the ML model 210. Upon generating the query that includes some form of the input data of the ML model 210, the query controller 212 is configured to send the query to the cloud computing system 300 for processing such that the cloud computing system 300 is enabled to provide the edge device 200 with a more accurate machine learning inference by using one of its ML models 314.

The cloud computing system 300 includes a number of ML models 314, which are hosted in a number of cluster nodes 316. A set of cluster nodes 316 may be grouped together in a cluster 318. Each cluster may include a set of 'n' nodes, where 'n' represents an integer number greater than one. An ML model 314 is configured to generate prediction data (which may be referred to as cloud prediction data 104) based on that input data, which was transferred as a query from an edge device 200 to that ML model 314. An ML model 314 of the cloud computing system 300 is a larger model compared to an ML model 210 of an edge device 200 such that ML model 314 provides greater accuracy than the ML model 210. The ML model 314 is a higher performing model compared to the ML model 210. The number of parameters of the ML model 314 may be greater than the number of parameters of the ML model 210. An amount of resources (e.g., memory resources, processing resources, etc.) used by the ML model 314 may be greater than an amount of resources used by the ML model 210. The ML model 314 is configured to perform the same task or a similar task as the ML model 210. As a non-limiting example, for instance, in FIG. 1, each ML model 314 comprises a YOLO model, e.g., YOLOv5x (x-large), which is configured to perform the predetermined task of real-time object detection.

Also, the cloud computing system 300 includes a load balancer 310, which is configured to receive all queries from the edge devices 200 before these queries are transmitted to the ML models 314. The number of queries transmitted to the cloud computing system 300 varies in intensity, load, and/or arrival pattern over time. The load balancer 310 serves as an intermediary between the edge devices 200 and the ML models 314 to manage the distribution of queries to the ML models 314. The load balancer 310 comprises software technology, hardware technology, or a combination of software technology and hardware technology. In addition, the load balancer 310 is configured to generate load state data for a given time period. For example, the load state data, for a given time period, may include the number of edge devices 200 that are connected and/or the number of queries received from the edge devices 200.

The cloud computing system 300 may be queried by one or more edge devices 200 at the same time. The cloud computing system 300 may be queried by a different number of edge devices 200 at different times. The cloud computing system 300 is configured to intelligently compute the query threshold data for the given time period. The query threshold data is determined by a level of activity or a level of busyness of the cloud computing system 300. The cloud computing system 300 may generate a query response, which includes the query threshold data. The cloud computing system 300 is configured to transmit the query threshold data and/or the query response to each edge device 200.

Also, as shown in FIG. 1, the cloud computing system 300 includes a reinforcement learning (RL) agent 312. The RL agent 312 is configured to gather load state data from the load balancer 310 and cluster state data from a number of cluster nodes 316. The RL agent 312 is configured to generate system state data using the load state data and cluster state data. The RL agent 312 is configured to perform a number of actions on one or more cluster nodes 316 based on this system state data so that the cloud computer system 300 is managed intelligently.

Figure 2:
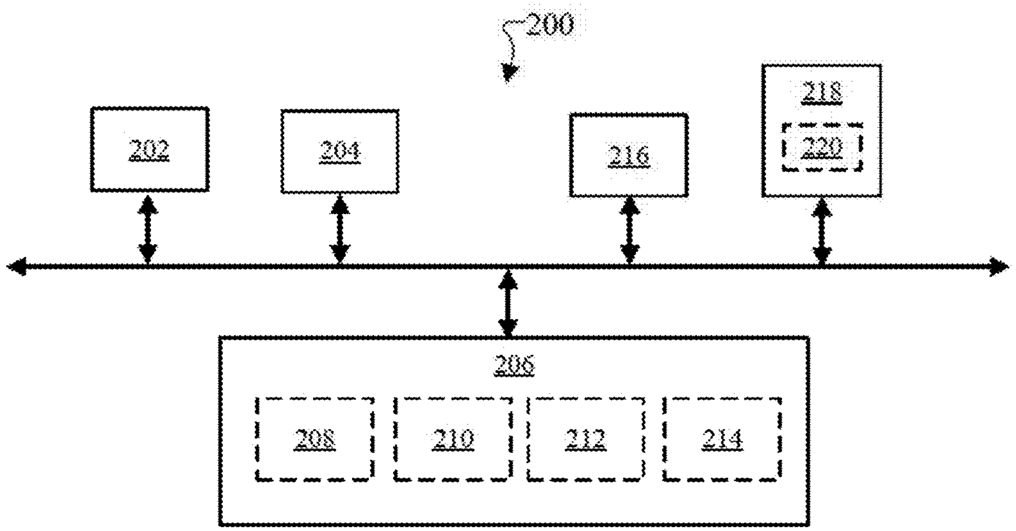
FIG. 2 is a block diagram that illustrates aspects of an example of an edge device according to an example embodiment of this disclosure.

FIG. 2 is a block diagram of an example of an edge device 200 according to an example embodiment. The edge device 200 includes at least a processing system 204 with at least one processing device. For example, the processing system 204 may include an electronic processor, a central processing unit (CPU), a graphics processing unit (GPU), a tensor processing unit (TPU), a microprocessor, a field-programmable gate array (FPGA), an application-specific integrated circuit (ASIC), any processing technology, or any number and combination thereof. The processing system 204 is operable to provide the functionality as described herein.

The edge device 200 includes a memory system 206, which is operatively connected to the processing system 204. In this regard, the processing system 204 is in data communication with the memory system 206. In an example embodiment, the memory system 206 includes at least one non-transitory computer readable storage medium, which is configured to store and provide access to various data to enable at least the processing system 204 to perform the operations and functionality, as disclosed herein. In an example embodiment, the memory system 206 comprises a single memory device or a plurality of memory devices. The memory system 206 may include electrical, electronic, magnetic, optical, semiconductor, electromagnetic, or any suitable storage technology that is operable with the edge device 200. For instance, in an example embodiment, the memory system 206 may include random access memory (RAM), read only memory (ROM), flash memory, a disk drive, a memory card, an optical storage device, a magnetic storage device, a memory module, any suitable type of memory device, or any number and combination thereof.

The memory system 206 includes at least an edge program 208, an ML model 210, a query controller 212, and other relevant data 214, which are stored thereon and which include computer readable data with instructions, which, when executed by the processing system 204, is configured to perform the functions as disclosed herein. The computer readable data may include instructions, code, routines, various related data, any software technology, or any number and combination thereof. The edge program 208 is configured to perform a number of functions for the edge device 200. For example, the edge program 208 is configured to manage machine learning inferences and/or control the edge device 200 based on machine learning inferences. The ML model 210 includes at least one machine learning system (e.g., artificial neural network, deep neural network, etc.), which is configured to perform a task (e.g., classification, etc.) of the edge device 200. The ML model 210 is a smaller model compared to the ML model 314. In this regard, the ML model 210 may have less parameters than the ML model 314. The ML model 210 uses less resources (e.g., memory resources, processing resources, etc.) than the ML model 314. In this regard, for example, the ML model 210 is configured to generate local prediction data based on input data. Also, the query controller 212 is configured to assess the local prediction data of the ML model 210 and determine if a query should be sent to the cloud computing system 300 based on its assessment. Meanwhile, the other relevant data 214 provides various data (e.g. operating system, etc.), which enables the system 100 to perform the functions as discussed herein.

The edge device 200 is configured to include at least one sensor system 202. The sensor system 202 includes one or more sensors. For example, the sensor system 202 includes an image sensor, a camera, a radar sensor, a light detection and ranging (LIDAR) sensor, a thermal sensor, an ultrasonic sensor, an infrared sensor, a motion sensor, an audio sensor (e.g., microphone), any suitable sensor, or any number and combination thereof. The sensor system 202 is operable to communicate with one or more other components (e.g., processing system 204 and memory system 206) of the edge device 200. For example, the sensor system 202 may provide sensor data, which is then used by the processing system 204 to generate digital image data based on the sensor data. In this regard, the processing system 204 is configured to obtain the sensor data as digital image data directly or indirectly from one or more sensors of the sensor system 202. The sensor system 202 is local, remote, or a combination thereof (e.g., partly local and partly remote). Upon receiving the sensor data, the processing system 204 is configured to process this sensor data (e.g. image data) in connection with the edge program 208, the ML model 210, the query controller 212, the other relevant data 214, or any number and combination thereof.

In addition, the edge device 200 may include at least one other component. For example, as shown in FIG. 2, the memory system 206 is also configured to store other relevant data 214, which relates to operation of the edge device 200 in relation to one or more components (e.g., at least one sensor system 202, at least one I/O devices 216, and other functional modules 218). In addition, the edge device 200 includes one or more I/O devices 216 (e.g., display device, microphone, speaker, etc.). Also, the edge device 200 includes other functional modules 218, such as any appropriate hardware, software, or combination thereof that assist with or contribute to the functioning of the edge device 200. For example, the other functional modules 218 include communication technology (e.g. wired communication technology, wireless communication technology, or a combination thereof) that enables components of the edge device 200 to communicate with each other as described herein. Also, the other functional modules 218 may include an actuator 220. As a non-limiting example, for instance, when the edge device 200 is a robot vacuum, then the one or more actuators 220 may relate to driving, steering, stopping, and/or controlling a movement of the robot vacuum. In this regard, with the edge program 208, the edge device 200 is configured to manage machine learning inferences, which are generated locally on the edge device 200 and/or obtained remotely via the cloud computing system 300.

Figure 3:
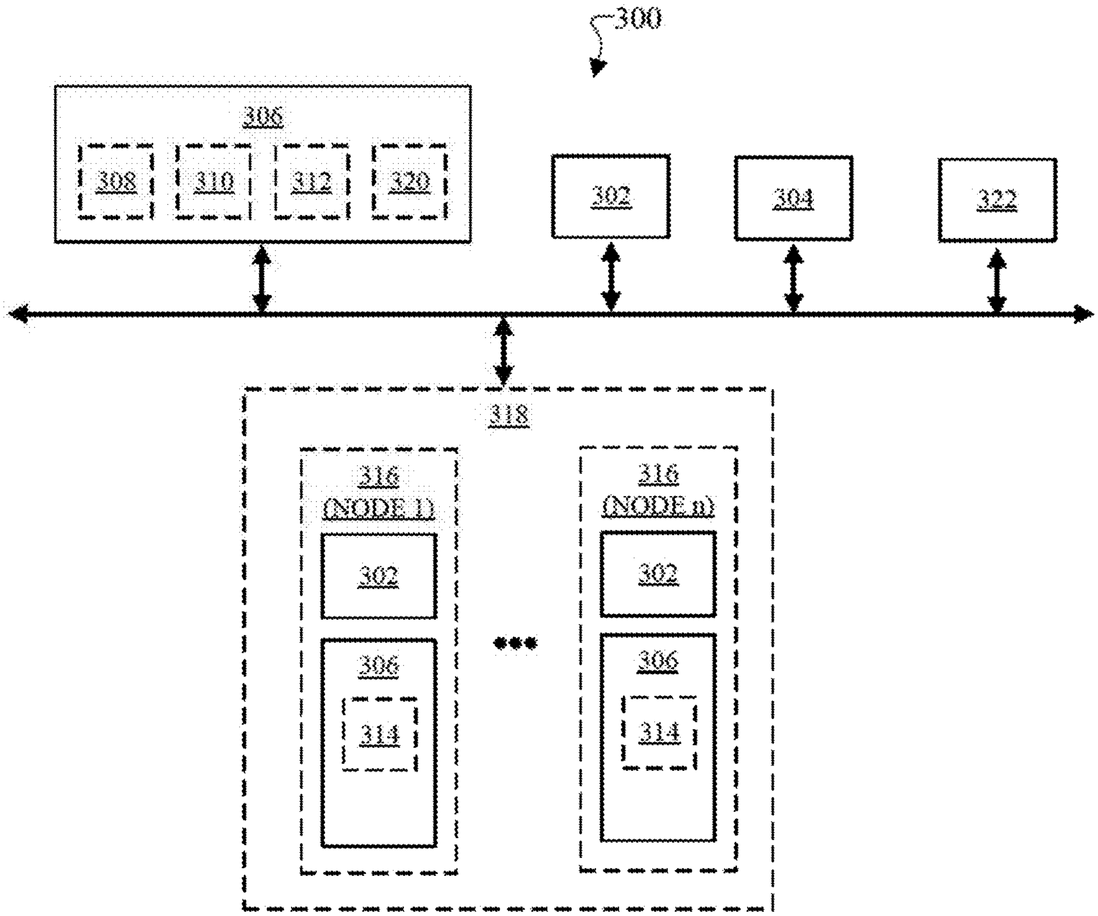
FIG. 3 is a block diagram that illustrates aspects of an example of a cloud computing system according to an example embodiment of this disclosure.

FIG. 3 is a block diagram of an example of a cloud computing system 300 according to an example embodiment. The cloud computing system 300 includes at least one processing system 302 with at least one processing device. For example, the processing system 302 may include an electronic processor, a CPU, a GPU, a TPU, a microprocessor, a FPGA, an ASIC, any processing technology, or any number and combination thereof. Each cluster node 316 may be associated with one or more processors of the processing system 302. The processing system 302 is operable to provide the functionality as described herein.

The cloud computing system 300 includes a memory system 306, which is operatively connected to the processing system 302. In this regard, the processing system 302 is in data communication with the memory system 306. In an example embodiment, the memory system 306 includes at least one non-transitory computer readable storage medium, which is configured to store and provide access to various data to enable at least the processing system 302 to perform the operations and functionality, as disclosed herein. The memory system 306 is typically very large in size. In this regard, the memory system 306 is significantly larger than the memory system 206 of an edge device 200. In an example embodiment, the memory system 306 comprises a single memory device or a plurality of memory devices. The memory system 306 may include electrical, electronic, magnetic, optical, semiconductor, electromagnetic, or any suitable storage technology that is operable with the cloud computing system 300. For instance, in an example embodiment, the memory system 306 may include random access memory (RAM), read only memory (ROM), GPU High Bandwidth Memory (HBM), flash memory, a disk drive, a memory card, an optical storage device, a magnetic storage device, a memory module, any suitable type of memory device, or any number and combination thereof.

The memory system 306 includes at least a cloud application program 308, the load balancer 310, the RL agent 312, one or more cluster nodes 316 with ML models 314 ("cloud ML models"), and other relevant data 320, which are stored thereon and which include computer readable data with instructions, which, when executed by the processing system 302, is configured to perform the functions as disclosed herein. More specifically, the cloud application program 308 is configured to operate and control the cloud computing system 300. The computer readable data may include instructions, code, routines, various related data, any software technology, or any number and combination thereof. In an example embodiment, the ML model 314 includes at least one machine learning model, which is a larger and higher performing model than the ML model 210 while being configured to perform at least the same task as the ML model 210. In this regard, for example, the ML model 210 may be a light-weight version of the ML model 314. In addition, each cluster node 316 hosts a set of ML models 314. Also, the load balancer 310 is configured to receive and manage the queries from the edge devices 200. The load balancer 310 is configured to generate load state data with respect to a current load (e.g., number of queries) of the cloud computing system 300. The RL agent 312 is configured to generate system state data based on the load state data from the load balancer 310 and the cluster state data from the cluster nodes 316. The RL agent 312 is configured to take one or more corresponding actions based on the system state data. Meanwhile, the other relevant data 320 provides various data (e.g. operating system, etc.), which enables the cloud computing system 300 to perform the functions as discussed herein.

In addition, the cloud computing system 300 may include at least one other component. For example, as shown in FIG. 3, the memory system 306 is also configured to store other relevant data 320, which relates to operation of the cloud computing system 300 in relation to one or more components thereof and/or edge devices 200 of the network. In addition, the cloud computing system 300 is configured to include one or more input/output (I/O) devices 322 (e.g., display device, keyboard device, speaker device, etc.), which relate to the cloud computing system 300. Also, the cloud computing system 300 includes other functional modules 304, such as any appropriate hardware, software, or combination thereof that assist with or contribute to the functioning of the cloud computing system 300. For example, the other functional modules 304 include communication technology (e.g. wired communication technology, wireless communication technology, or a combination thereof) that enables components of the cloud computing system 300 to communicate with each other and/or each edge device 200 as described herein.

Figure 4:
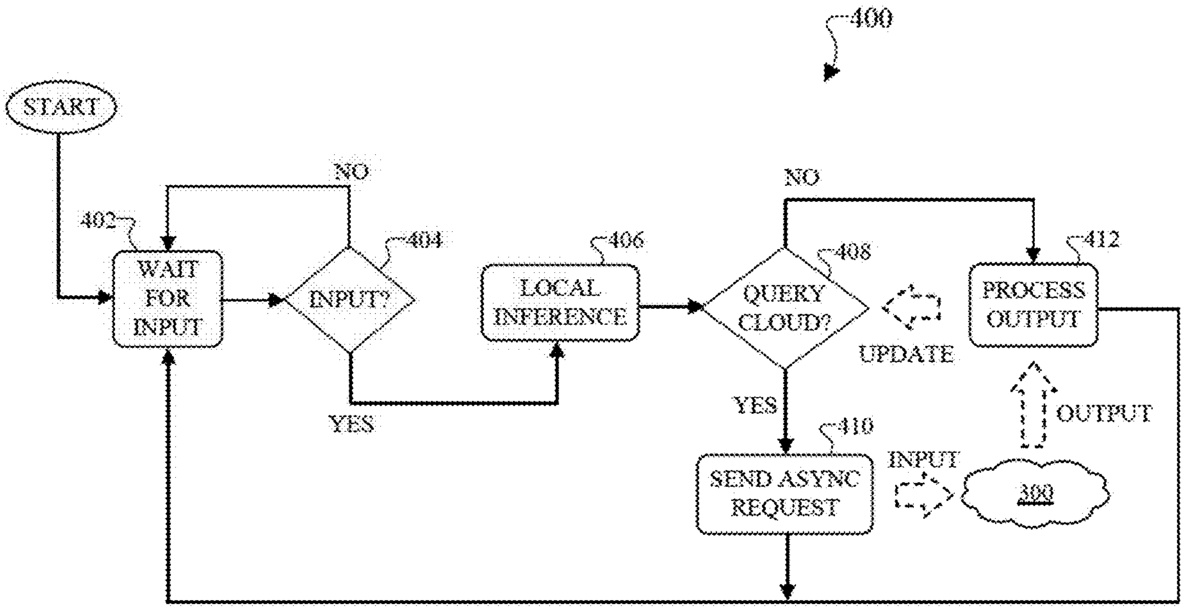
FIG. 4 is a flow diagram that illustrates aspects of an example of an edge device according to an example embodiment of this disclosure.

FIG. 4 is a flow diagram of an example of a process 400 of an edge device 200 according to an example embodiment. The process 400 includes a number of steps. In this regard, the process 400 may include more steps or less steps than that shown in FIG. 4 provided that the same or similar functions are provided. The process 400 is performed at least by one or more processors of an edge device 200. In this regard, although the system 100 may include a plurality of edge devices 200, the process 400 is explained with respect to one edge device 200 as an illustrative example.

At step 402, according to an example, the edge device 200 is configured to receive input data. In this regard, for example, the edge device 200 is in an operating state and waiting to receive input data. The input data may include sensor data from one or more sensors of the sensor system 202. The input data includes user input from one or more I/O devices 216 of the edge device 200. For example, the input data may include sensor data or sensor-fusion data (e.g., one or more digital images and/or digital video).

At step 404, according to an example, the edge device 200 determines if input data for the ML model 210 has been received. The edge device 200 may also determine if the input data is valid and/or suitable input for the ML model 210. For example, the edge device 200 is configured to receive input data, which may include sensor data from the sensor system 202, user input from an I/O device 216, any suitable data, or any number and combination thereof. When input data is received by the edge device 200 at step 404, then the process 400 proceeds to step 406. Alternatively, when input data is not received by the edge device 200 at step 404, then the process 400 proceeds to step 402.

At step 406, according to an example, the edge device 200 performs inference locally via the ML model 210 using the input data. More specifically, the ML model 210 generates output data (e.g., local prediction data 102 and confidence score data) based on the input data. After inference is performed locally on the edge device 200, then the process 400 proceeds to step 408.

At step 408, according to an example, the edge device 200 determines whether or not to query the cloud computing system 300. For instance, as discussed with respect to FIG. 1, the query controller 212 is configured to generate an assessment result indicative of whether or not to offload the input data (e.g., sensor data) to the cloud computing system 300. The query controller 212 generates the assessment result based on at least the three components (e.g., confidence score data, query threshold data, and network delay data).

The edge device 200 is configured to generate assessment data by assessing a non-negative monotonically increasing function involving at least the confidence score data and the network latency with respect to the query threshold data. For example, $f(\mathrm{Conf}, L_{network})$ may be used to represent the non-negative monotonically increasing function that receives Conf and $L_{network}$ as input data. More specifically, as an example, for instance, $f(\mathrm{Conf}, L_{network})=\mathrm{Conf}+w\cdot L_{network}$, as expressed in equation 1, where Conf refers to the confidence score data, w refers to a weighting factor, $L_{network}$ refers to the latency of the network, and Thres refers to the query threshold data. In this example, w may be chosen based on expected network delay from an average edge device 200 of the system 100. In particular, w refers to the application-specific, relative sensitivity of the offload decision with respect to confidence score versus network latency. The query threshold data may be determined by the cloud computing system 300 based on an activity level and/or an offload tendency controlled from the cloud computing system 300.

$$Conf + w \cdot L_{network} < Thres \qquad [1]$$

If equation 1 is satisfied and the inequality is true (i.e., the left expression is less than the query threshold data), then the edge device 200 generates an assessment result indicative of offloading/querying the cloud computing system 300. When equation 1 is satisfied, the process 400 proceeds to step 410. Alternatively, if equation 1 is not satisfied and the inequality is false (i.e., the left expression is greater than or equal to the query threshold data), then the edge device 200 generates an assessment result indicative of not offloading and not querying the cloud computing system 300. When equation 1 is not satisfied, the process 400 proceeds to step 412.

At step 410, according to an example, the edge device 200 generates a query, which includes the input data or some form of the input data. The edge device 200 sends the query as an asynchronous request to the cloud computing system 300. In this regard, the cloud computing system 300 receives the query from the edge device 200. More specifically, the load balancer 310 receives the query and transmits the query (e.g., sensor data) to an ML model 314. The cloud computing system 300 generates, via the ML model 314, prediction data (or cloud prediction data 104) based on the input data.

At step 412, according to an example, the edge device 200 processes output from (i) the ML model 210 or (ii) the ML model 210 and the ML model 314, respectively. More specifically, in the first case, the edge device 200 may process output (e.g., local prediction data 102) from the ML model 210 when the assessment result indicates that a query should not be sent to the cloud computing system 300. In this first case, the edge device 200 is configured to assign the local prediction data 102 as being the prediction result 106.

Alternatively, in the second case, the edge device 200 processes the output from the ML model 210 and then determines to offload the input data to the cloud computing system 300 based on the assessment result. The edge device 200 then processes the output (e.g., cloud prediction data 104 and query threshold data) from the cloud computing system 300. In this second case, the edge device 200 is configured to assign the cloud prediction data 104 as the prediction result 106. That is, in this second case, the edge device 200 does not assign the local prediction data 102 as the prediction result 106.

The edge device 200 is configured to provide the prediction result 106 as output data for the given machine learning task in response to the input data. As a non-limiting example, for instance, if the edge device 200 is a robot vacuum, then the edge device 200 is configured to use the prediction result 106, which is selected as being either the local prediction data 102 or the cloud prediction data 104, in controlling one or more actuators of the robot vacuum. In this case, the robot vacuum may receive digital images as input data from a camera sensor on the robot vacuum. The ML model 210 and the ML model 314 may be configured to perform a classification task to identify objects in the digital images so as to control an operation of the robot vacuum based on these identified objects.

As discussed in FIG. 4, the edge device 200 receives input data. This input data is locally processed via the ML model 210 of the edge device 200 before the query controller 212 decides whether or not to offload this input data to the cloud computing system 300. If the query controller 212 decides to offload this input data as a query to the cloud computing system 300, then the edge device 200 transmits the query, which includes the input data, as an asynchronous request to the cloud computing system 300. In this regard, with this asynchronous request, the edge device 200 does not have to wait to receive the query response from the cloud computing system 300 before processing the next input data. The edge device 200 is configured to immediately and directly wait for and/or obtain the next input data of the ML model 210 even if the query response has not yet been received. The edge device 200 is configured to receive the latest query threshold data after querying the cloud computing system 300. Since the cloud computing system 300 will include the query threshold data in the query response, then this query threshold data will be used to update the query controller 212. The query controller 212 uses this updated query threshold data in determining whether or not to query the cloud computing system 300 the next time.

As discussed, the process 400 is advantageous in implementing an adaptive query technique to the cloud computing system 300 that maintains a relatively simple, yet effective query controller 212 on the edge device 200 while maintaining a more complex and compute-demanding RL agent 312 on the cloud computing system 300. In this regard, the RL agent 312 is configured to generate system state data and perform a number of actions based on the system state data. For example, the RL agent 312 is configured to allocate or deallocate resources of the cloud computing system 300 during load scaling. The RL agent 312 is configured to monitor and/or control latency costs. The RL agent 312 is configured to monitor and/or control costs associated with operating the cloud computing system 300. The RL agent 312 is configured to calculate the query threshold data and communicate the query threshold data to each edge device 200. In addition, the RL agent 312 is configured to perform at least one action at one or more fixed time intervals. For example, the RL agent 312 is configured to perform at least one action from at least a predetermined set of actions, as indicated in TABLE 1.

TABLE 1

| | ACTIONS OF RL AGENT |
|---|---|
| 1 | Do nothing |
| 2 | Allocate more cloud computing resources |
| 3 | Deallocate some cloud computing resources |
| 4 | Increase the query threshold data |
| 5 | Decrease the query threshold data |

Also, the system 100 may have different system dynamics at a current time of action compared to the previous time of action (e.g., more edge devices 200 may have started the service, more ML models 314 may be employed, more cluster nodes 316 may be allocated). The system 100 may exhibit or include a number of system states. Each system state is represented by system state data. In this regard, a system state may be represented by one or more of the following features, as indicated in TABLE 2.

TABLE 2

| | FEATURES REPRESENTING THE SYSTEM STATE |
|---|---|
| 1 | $N_{edge}$, which represents the number of edge devices 200 connected to the cloud computing system 300 at time t, |
| 2 | $\Delta N_{edge}$, which represents the change (e.g., increase or decrease) in the number of edge devices 200 from time t − 1 to time t, |
| 3 | $N_{cloud}$, which represents the amount of cloud resources (e.g., the number of cluster nodes 316) at time t, |
| 4 | $N_{req}$, which represents the number of cloud queries processed from time t − 1 to time t, |
| 5 | $L_{req}$, which represents the aggregated latency (e.g., average latency, tail latency) associated with the $N_{req}$ cloud queries, |
| 6 | $C_{cloud}$, which represents costs of the cloud computing system 300 incurred from time t − 1 to time t, and |
| 7 | Thres, which represents the offloading threshold of the cloud computing system 300 at time t |

Since the number of actions are finite (e.g., five actions of TABLE 1), and the number of system states is high dimensional and has continuous features, the RL agent 312 is trained via at least one deep RL algorithm. For example, for instance, the RL agent 312 comprises a standard Deep Q-Network (DQN), which uses a DNN model to approximate the Q-value and chooses an action that returns the best Q-value (i.e., cumulative long-term reward). More specifically, TABLE 3 describes a number of aspects of the reward function for the above example in which the RL agent 312 uses the DQN.

TABLE 3

| | ASPECTS OF THE REWARD FUNCTION |
|---|---|
| 1 | Higher reward for a greater number of requests processed in the cloud computing system 300, as this aspect relates to higher overall system accuracy |
| 2 | Penalize the cloud cost data (which is proportional to the amount of cloud computing resources) |
| 3 | Penalize the system overhead (e.g., time and effort needed to allocate/deallocate resources, etc.) from taking an action. Referring to TABLE 1, Action 1, Action 4, and/or Action 5 will have no overhead, but allocating/deallocating cloud computing resources will have some overhead and is not performed too frequently. |

Although the above example refers to the RL agent 312 using the standard DON, the RL agent 312 may involve other RL algorithms. As one example, the RL agent 312 comprises a soft actor-critic that involves an off-policy actor-critic deep RL algorithm based on the maximum entropy reinforcement learning framework. In this off-policy actor-critic deep RL framework, the RL agent 312 or the stochastic actor aims to maximize expected reward while also maximizing entropy. As another example, the RL agent 312 uses a Double DQN algorithm. In this regard, the RL agent 312 may comprise an RL algorithm that provides the functionalities and objectives as described in this disclosure.

Figure 5:
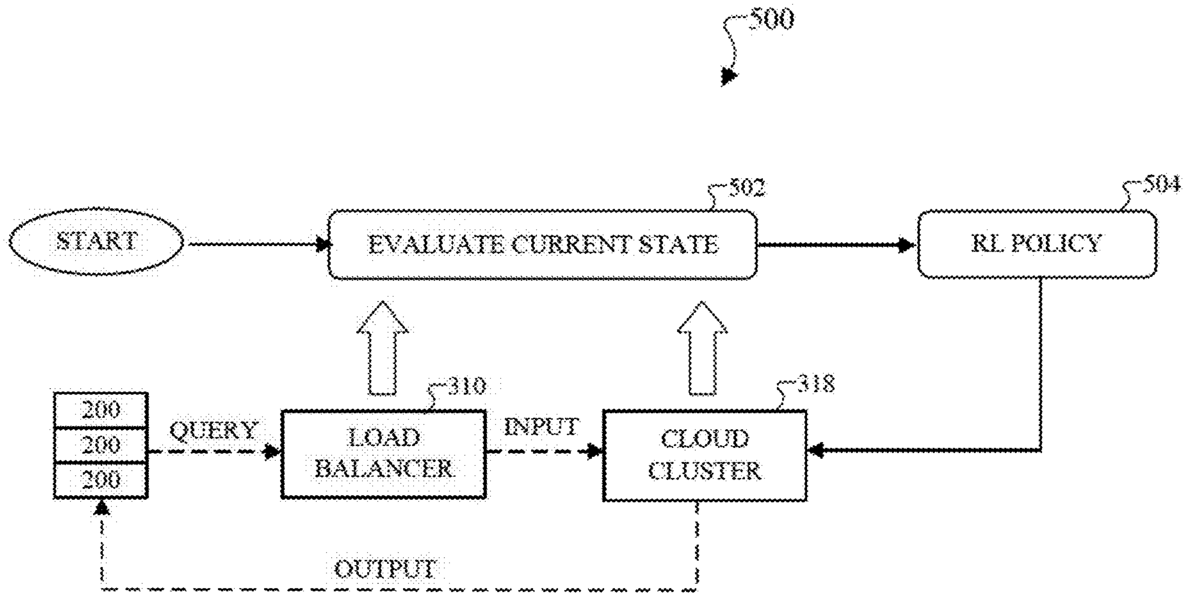
FIG. 5 is a flow diagram that illustrates aspects of an example of a cloud computing system according to an example embodiment of this disclosure.

FIG. 5 is a flow diagram that illustrates an example of a process of 500 an RL agent 312 of the cloud computing system 300 according to an example embodiment. In this regard, FIG. 5 shows a process 500 with a number of steps that performed by the RL agent 312, via one or more processors of the cloud computing system 300. The process 500 may include more steps or less steps than that shown in FIG. 5 provided that such steps provide at least the same or similar functions as described herein.

At step 502, the RL agent 312 interacts with an environment of the cloud computing system 300. The RL agent 312 is configured to evaluate a current system state of the cloud computing system 300 at the current time period. More specifically, at fixed intervals, the RL agent 312 uses the load state data from the load balancer 310 and the cluster state data of the cluster nodes 316 of the cluster 318 to determine and generate the current system state data. Upon determining a current system state of the environment and generating current system state data, the process 500 proceeds to step 504.

At step 504, the RL agent 312 selects and implements at least one RL policy, which is applicable based on the current system state data, which was obtained at step 502. Once the RL agent 312 has the system state data, the trained RL agent 312 uses one or more RL policies to determine the best action to take at this current time period. For example, the RL agent 312 may change the amount of cloud computing resources (e.g., GPUs, CPUs, TPUs, etc.) in the cluster node 316, update the query threshold data, take another predetermined action, or any number and combination thereof.

In addition, in the examples discussed above, the system 100 is modeled as a Markov Decision Process (MDP), as expressed in equation 2. More specifically, in equation 2, S represents the full system state space (including all edge devices and the cloud server). In equation 2, A represents the set of actions (discrete) that may be performed by the RL agent 312 in the cloud computing system 300. Meanwhile, in equation 2, R represents the reward of taking a certain action under certain system state data. The system 100 maps a state-action pair (x, $\alpha$)$\in \mathcal{S}\times\mathcal{A}$ to an immediate reward. P is the transition probability kernel, defining the probability measure over the next system state and the reward.

$$M_{sys} = (S, A, R, P) \quad [2]$$

The objective is to find a policy $\pi^*: \mathcal{S} \rightarrow \mathcal{A}$, as expressed in equation 3, where the expectation is taken with respect to the transition probability kernel $\mathcal{P}$ and $\gamma \in (0,1)$ represents diminishing reward in the future. The time step is represented as i ranging from the current time t to infinite future.

$$\pi^* = \underset{x}{\operatorname{argmax}} E\left[\sum_{i=t}^{\infty} \gamma^{i-t} \mathcal{R}(s_t, \pi(s_t))\right] \quad [3]$$

Also, as shown in FIG. 1, the RL agent 312 is configured to manage the cloud resources and control an offloading tendency of the edge devices 200. The RL agent 312 is configured to select and perform an action from a predetermined set of actions. For instance, in this example, an action includes doing nothing. An action includes adding or spawning a certain amount of processing containers (e.g., GPU, CPU, etc.) in the cloud computing system 300. An action includes removing a certain amount of processing containers (e.g., GPU, CPU, etc.) in the cloud computing system 300. An action includes increasing the query threshold data or increasing the offloading level of edge devices 200. An action includes decreasing the query threshold data or decreasing the offloading level of edge devices 200. Upon selecting an action, the RL agent 312 is configured to perform the action at time t, which may be represented as $\alpha_t$ in equation 4. Also, in equation 4, M represents a number that may be set, for example, by a user. As a non-limiting example, for instance, if M=10, then $\alpha_t$=1 means that the RL agent 312 is configured to increase the number of GPU containers by 10% at time t. In addition, L represents a number that may be set according to the application and/or configuration of the system 100. As a non-limiting example, for instance, if L=0.05, then $\alpha_t$=3 means that the RL agent 312 is configured to increase the edge offload threshold by 0.05 and then $\alpha_t$=4 means that the RL agent 312 is configured to decrease the edge offload threshold by 0.05.

$$a_t = \begin{cases} 0, \text{ Do Nothing}, \\ 1, \text{ add } M \text{ \% cloud resources}, \\ 2, \text{ remove } M \text{ \% cloud resources}, \\ 3, \text{ increase edge offload threshold by } L, \\ 4, \text{ decrease edge offload threshold by } L \end{cases} \quad [4]$$

Also, the state space is for the entire system 100, which includes the central cloud computing system 300 and all the edge devices 200. As aforementioned, the system state data may be determined by one or more of the features discussed in TABLE 2. More specifically, in an example embodiment, the system state data $s_t$ at time t may be represented by a seven-state tuple vector, as expressed in equation 5.

$$s_t = [N_{edge}, \Delta N_{edge}, N_{cloud}, N_{req}, L_{req}, C_{cloud}, Thres] \quad [5]$$

Also, the objective of the RL agent 312 on the cloud-side of the system 100 is to maximize the number of predictions performed by the cloud computing system 300 without exceeding a cost budget, while guaranteeing a latency target, $L_{target}$. As an example, the system 100 and/or the RL agent 312 defines the immediate reward as R($s_t$, $\alpha_t$), as indicated in equation 6. The $N_{reg}$ and $C_{cloud}$ only depend on the current state, while the Cost ($\alpha_t$) returns the cost of adding/removing cloud resources. Also, in equation 6, k represents a given, application-specific number that weighs a relative sensitivity of the immediate reward to the number of requests or the number of queries fulfilled by the cloud computing system 300 versus cloud costs Cost($\alpha_t$). More specifically, in equation 6, k≥0.

$$R(s_t, a_t) = \begin{cases} k \cdot N_{req} - (C_{cloud} + \text{Cost } (a_t)) & \text{if } L_{req} \le L_{target} \\ -(C_{cloud} + \text{Cost } (a_t)) & \text{otherwise} \end{cases} \quad [6]$$

As described in this disclosure, the embodiments include a number of advantages and provide a number of benefits. For example, the system 100 is cost-effective and robust to the scaling of edge devices 200 because the system 100 is configured to quickly adjust its resource allocation on the cloud computing system 300. The cloud computing system 300 dynamically adapts to the demands of the edge devices 200 and controls the query threshold data of each edge device 200 accordingly. In addition, the system 100 is configured to prevent at least two major disadvantages that are associated with a fixed amount of computing resources. For example, the system 100 does not incur unnecessary costs of cloud resources during time periods of low demands from edge devices 200. Also, the system 100 prevents overshooting latency of the cloud computing system 300 when transitioning from low demand to high demand.

In addition, the system 100 is advantageous in providing edge devices 200, whereby each edge device 200 is configured to provide a prediction result for a machine learning task with greater prediction accuracy and at a faster rate via its well-managed communications with the cloud computing system 300. Also, the company, which provides the edge devices 200 as products, are able to manage and control their cloud operational costs while providing the benefits of cloud resources to their customers.

Furthermore, the system 100 is configured to intelligently manage cloud operational costs and its scaling when the number of edge devices 200 connected to the cloud computing system 300 changes (e.g., the number of edge devices 200 increases sharply in a relatively short amount of time). The cloud operational cost is a key metric, which may directly affect revenue when providing high-accuracy inferences of cloud machine learning models to edge devices 200. In addition, scalability is also an advantageous feature as many users may use their edge devices 200 simultaneously (i.e., peak hours). Advantageously, the system 100 is configured to manage the cloud costs and latency even when the number of edge devices 200 changes.

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method for controlling an edge device, the computer-implemented method comprising:

receiving sensor data;

generating, via a local machine learning model, local prediction data using the sensor data, the local prediction data being associated with confidence score data indicating likelihood of the local prediction data;

receiving query threshold data from a cloud computing system;

generating an assessment result indicative of whether or not to transmit a query with the sensor data to the cloud computing system, the assessment result being assessed using the confidence score data and the query threshold data;

assigning the local prediction data as a prediction result when the assessment result indicates that the query is not being transmitted to the cloud computing system;

assigning cloud prediction data as the prediction result when the assessment result indicates that the query is being transmitted to the cloud computing system, the cloud prediction data being received from the cloud computing system in response to the query; and controlling the edge device using the prediction result.

2. The computer-implemented method of claim 1, wherein the assessment result is generated by evaluating an inequality, the inequality being $$f(Conf, L_{network}) < Thres,$$

where

Conf is a number representing the confidence score data, $L_{network}$ is a number greater than zero and represents an average round-trip network delay between the edge device and the cloud computing system, $f(Conf, L_{network})$ is a non-negative monotonically increasing function with Conf and $L_{network}$ as input data, and Thres represents the query threshold data.

3. The computer-implemented method of claim 2, wherein:

the assessment result is indicative of querying the cloud computing system when the inequality is satisfied and evaluated to be true; and the assessment result is indicative of not querying the cloud computing system when the inequality is not satisfied and evaluated to be false.

4. The computer-implemented method of claim 2, wherein:

$$f(Conf, L_{network}) = Conf + w \cdot L_{network},$$

where w is a number representing a weighting factor indicative of a sensitivity of Conf relative to $L_{network}$.

5. The computer-implemented method of claim 1, wherein:

the cloud prediction data is generated by a cloud machine learning model, the cloud machine learning model being remote to the edge device and being a part of the cloud computing system; and the cloud machine learning model is a larger and more accurate model than the local machine learning model of the edge device.

6. The computer-implemented method of claim 1, wherein the sensor data is not transmitted to the cloud computing system when the assessment result indicates that the query is not being transmitted to the cloud computing system.

7. The computer-implemented method of claim 1, further comprising:

controlling an actuator based on the prediction result, wherein the actuator is controlled via the edge device.

8. A system comprising:

one or more processors; and one or more memory in data communication with the one or more processors, the one or more memory including computer readable data stored thereon that, when executed by the one or more processors, causes the one or more processors to perform a method for controlling an edge device, the method including receiving sensor data;

generating, via a local machine learning model, local prediction data using the sensor data, the local prediction data being associated with confidence score data indicating likelihood of the local prediction data;

receiving query threshold data from a cloud computing system;

generating an assessment result indicative of whether or not to transmit a query with the sensor data to the cloud computing system, the assessment result being assessed using the confidence score data and the query threshold data;

assigning the local prediction data as a prediction result when the assessment result indicates that the query is not being transmitted to the cloud computing system;

assigning cloud prediction data as the prediction result when the assessment result indicates that the query is being transmitted to the cloud computing system, the cloud prediction data being received from the cloud computing system in response to the query; and controlling the edge device using the prediction result.

9. The system of claim 8, wherein the assessment result is generated by evaluating an inequality, the inequality being $$f(Conf, L_{network}) < Thres,$$

where

Conf is a number representing the confidence score data, $L_{network}$ is a number greater than zero and represents an average round-trip network delay between the edge device and the cloud computing system, f(Conf, $L_{network}$) is a non-negative monotonically increasing function with Conf and $L_{network}$ as input data, and Thres represents the query threshold data.

10. The system of claim 9, wherein:

the assessment result is indicative of querying the cloud computing system when the inequality is satisfied and evaluated to be true; and the assessment result is indicative of not querying the cloud computing system when the inequality is not satisfied and evaluated to be false.

11. The system of claim 9, wherein:

$$f(Conf, L_{network}) = Conf + w \cdot L_{network},$$

where w is a number representing a weighting factor indicative of a sensitivity of Conf relative to $L_{network}$.

12. The system of claim 8, wherein:

the cloud prediction data is generated by a cloud machine learning model, the cloud machine learning model being remote to the edge device and being a part of the cloud computing system; and the cloud machine learning model is a larger and more accurate model than the local machine learning model of the edge device.

13. The system of claim 8, wherein the sensor data is not transmitted to the cloud computing system when the assessment result indicates that the query is not being transmitted to the cloud computing system.

14. The system of claim 8, further comprising:

an actuator, wherein the actuator is controlled via the edge device using the prediction result.

15. One or more non-transitory computer-readable media that store instructions that, when executed by one or more processors, cause the one or more processors to perform a method for controlling an edge device, the method comprising:

receiving sensor data;

generating, via a local machine learning model, local prediction data using the sensor data, the local prediction data being associated with confidence score data indicating likelihood of the local prediction data;

receiving query threshold data from a cloud computing system;

generating an assessment result indicative of whether or not to transmit a query with the sensor data to the cloud computing system, the assessment result being assessed using the confidence score data and the query threshold data;

assigning the local prediction data as a prediction result when the assessment result indicates that the query is not being transmitted to the cloud computing system;

assigning cloud prediction data as the prediction result when the assessment result indicates that the query is being transmitted to the cloud computing system, the cloud prediction data being received from the cloud computing system in response to the query; and controlling the edge device using the prediction result.

16. The one or more non-transitory computer-readable media of claim 15, wherein the assessment result is generated by evaluating an inequality, the inequality being $$f(Conf, L_{network}) < Thres,$$

where

Conf is a number representing the confidence score data, $L_{network}$ is a number greater than zero and represents an average round-trip network delay between the edge device and the cloud computing system, f(Conf, $L_{network}$) is a non-negative monotonically increasing function with Conf and $L_{network}$ as input data, and Thres represents the query threshold data.

17. The one or more non-transitory computer-readable media of claim 16, wherein:

the assessment result is indicative of querying the cloud computing system when the inequality is satisfied and evaluated to be true; and the assessment result is indicative of not querying the cloud computing system when the inequality is not satisfied and evaluated to be false.

18. The one or more non-transitory computer-readable media of claim 16, wherein:

$$f(Conf, L_{network}) = Conf + w \cdot L_{network},$$

where w is a number representing a weighting factor indicative of a sensitivity of Conf relative to $L_{network}$.

19. The one or more non-transitory computer-readable media of claim 15, wherein:

the cloud prediction data is generated by a cloud machine learning model, the cloud machine learning model being remote to the edge device and being a part of the cloud computing system; and the cloud machine learning model is a larger and more accurate model than the local machine learning model of the edge device.

20. The one or more non-transitory computer-readable media of claim 15, wherein the sensor data is not transmitted to the cloud computing system when the assessment result indicates that the query is not being transmitted to the cloud computing system.

* * * * *